United States Patent Office 3,455,785
Patented July 15, 1969

3,455,785
MICROBIOLOGICAL PROCESS
Walter Dion Butt, Wootton, near Canterbury, Kent, England, assignor to Lever Brothers Company, New York, N.Y., a corporation of Maine
No Drawing. Filed Apr. 19, 1966, Ser. No. 543,511
Claims priority, application Great Britain, Apr. 22, 1965, 16,946/65
Int. Cl. C12d 1/02; C12c 3/12
U.S. Cl. 195—30                6 Claims

ABSTRACT OF THE DISCLOSURE

Isolinoleic acid (octadeca-11,15-dienoic acid) is prepared by partially hydrogenating linolenic acid (octadeca-9,12,15-trienoic acid) or an ester or soap thereof by subjecting it to the reducing activity of bacteria of the species Clostridium sporogenes or Lactobacillus helveticus and then recovering the isolinoleic acid.

---

This invention relates to a method for the preparation of unsaturated fatty acids, in particular by partial hydrogenation of polyunsaturated fatty acids or their compounds.

More specifically, the invention provides a method for the preparation of octadeca-11:15-dienoic acid, which comprises partially hydrogenating a polyunsaturated fatty compound containing at least three olefinic double bonds with bacteria of the genus Clostridium or Lactobacillus.

Particularly suitable polyunsaturated fatty compounds from which octadeca-11:15-dienoic acid may be produced by partial bacterial hydrogenation are polyunsaturated trienoic fatty compounds containing the grouping:

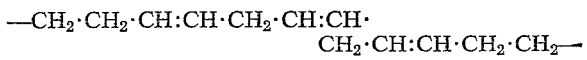

—CH$_2$·CH$_2$·CH:CH·CH$_2$·CH:CH·
  CH$_2$·CH:CH·CH$_2$·CH$_2$—

Such compounds may, for example, be linolenic acid (octadeca-9-12-15-trienoic acid), its glycerides, esters and soaps, mixtures thereof with other fatty acids such as can be obtained by hydrolysis of oils, and mixtures thereof with fatty glycerides, esters and soaps.

The preferred compound is an oil containing linolenyl glycerides, for example linseed oil or soyabean oil. Free linolenic acid may be used provided it is dispersed in a suitable carrier, such as paraffin oil or olive oil.

The micro-organisms are preferably of the species Clostridium sporogenes or Lactobacillus helveticus.

Actively growing cells of the selected organism are preferably first cultured in a suitable nutrient medium for a time insufficient to attain maximum growth but sufficient to ensure that the bacteria are reprdoucing logarithmically. The cells may then be washed, for example by centrifugation, suspended in a suitable vehicle such as water, and then introduced into a medium suitable for supporting further active growth and containing the polyunsaturated fatty compound. Alternatively, cells of either organism, or spores of Clostridium, may be introduced directly into the medium containing the polyunsaturated fatty compound.

As a further alternative, cells may be grown in any suitable medium long enough for the culture to reach the stationary phase of growth. The culture so prepared may then be added either directly or after washing to a medium containing the polyunsaturated fatty compound.

Microbiological hydrogenation according to the invention is usually carried out under anaerobic conditions. Preferably the medium is stirred and blanketed with an inert gas, such as nitrogen.

The polyunsaturated fatty compound may be introduced into the medium directly or as an emulsion. Preferably an emulsion is first prepared with water or a portion of liquid medium, plus a small proportion of any suitable emulsifying agent, and the emulsion is then added, together with cells of the chosen organism, to the bulk of the medium. The medium is preferably stirred, shaken or otherwise agitated throughout the period of incubation, to ensure that the polyunsaturated fatty compound is adequately dispersed.

The process according to the invention may be carried out as a batch process or it may be operated as a continuous process. When the process is carried out batchwise the time of incubation is preferably one to seven days. When incubation times significantly shorter than 12 hours are employed very little yield is obtained, whereas prolonged incubation beyond seven days may add little to the yield.

The temperature range within which the microbial hydrogenation normally occurs depends on the organism used. Thus a temperature of from 10° to 45° C., preferably 25° to 40° C. may be applied when using Clostridia, whereas with the Lactobacilli the incubation temperature may be from 20° to 50° C., preferably 35° to 40° C.

The pH of the medium containing the fatty compound should preferably be between 5.5 and 8.5, generally about pH 7.0. Lactobacilli will, in general however, tolerate a lower pH than clostridia.

The recovery of free iso-linoleic acid can be achieved, for example, by acid-ether extraction. The oil emulsion is first preferably broken by shaking with methanol and then the reaction mixture may be acidified, for example with sulphuric acid to a pH of 1 to 2, and the lipid material extracted with ether. The free fatty acids may then conveniently be further separated as their soaps from other liquid materials by extraction with an alkali, such as sodium hydroxide. Further acidification and ether extraction is then necessary to obtain the free fatty acids. The iso-linoleic acid may be separated from the other free fatty acids by known methods such as preparative gas-liquid chromatography or counter-current distribution.

Octadeca-11:15-dienoic acid is of particular use in the flavouring of foodstuffs, in particular for imparting a cream or butter-like flavour to the foodstuff.

The acid may first be oxidised to form a flavour compound and the product of this oxidation added to the foodstuff to be flavoured. Alternatively the acid may be added directly to the foodstuff and autoxidised in situ to the flavour compound, thus producing the desired flavour in the foodstuff.

Octadeca-11:15-dienoic acid or its oxidation products may conveniently be incorporated in the foodstuff together with a suitable diluent, for example an edible oil.

The following examples illustrate the invention.

EXAMPLE 1

This example describes the production of iso-linoleic acid from linseed oil using Clostridium sporogenes.

Cells of Clostridium sporogenes 1365 were grown in 3% peptone at pH 7.4 under nitrogen for 48 hours at 37° C. with stirring. Linseed oil was added to the culture at a level of 1% and the culture was regased with nitrogen. Incubation was continued under these conditions for 6 days.

At the end of this period the culture was acidified with dilute hydrochloric acid and extracted with about one-tenth of its volume of diethyl ether using a little methanol to break the emulsion. The free fatty acids were extracted from the ether layer by washing twice with equal volumes of 1.5 N potassium hydroxide. After acidification of the combined alkali washings, the fatty acids were extracted into ether. The ether solution was dried and the solvent evaporated to give a mixture of fatty acids containing about 30% of iso-linoleic acid. This isomer was separated from other fatty acids present by preparative gas-liquid chromatography.

EXAMPLE 2

This example follows that of Example 1, except that the linseed oil was added to the medium before inoculation with *Clostridium sporogenes*. After inoculation, incubation was carried out for 6 days at 37° C. under nitrogen with stirring.

The yield of iso-linoleic acid was again about 30% but there was a greater proportion of short chain fatty acids also present than was found in the preparation described in Example 1.

EXAMPLE 3

This example describes the preparation of iso-linoleic acid from linseed oil, using washed cells of *Clostridium sporogenes*.

The cells used were grown in a medium containing 3% peptone and 1% glucose, at pH 7.4 under nitrogen at 37° C., for 24 hours, and harvested with a continuous flow centrifuge. These cells were washed twice with, and then suspended in 1% sodium thioglycollate solution. 50 ml. of the suspension (containing 14 g. wet weight of cells) was mixed with 20 ml. of a 0.1 M phosphate buffer, pH 7.4 and 80 ml. of 25% emulsion of linseed oil in a solution of 2.25% Edifas A plus 1.5% Edifas B. This reaction mixture was gased with nitrogen and incubated under nitrogen at 37° C. for 6 days.

As described in Example 1, the free fatty acid fraction was isolated by alkali washing and the iso-linoleic acid separated from the mixed fatty acids by preparative gas-liquid chromatography.

EXAMPLE 4

This example describes the preparation of iso-linoleic acid by hydrogenation of soyabean oil using a growing culture of *Clostridium sporogenes*.

The medium described in Example 1 containing soyabean oil instead of linseed oil, was insubated with a growing culture of *Clostridium sporogenes* for 6 days at 37° C. under nitrogen and the iso-linoleic acid separated as described in Example 1.

What is claimed is:

1. A method for the preparation of octadeca-11,15-dienoic acid which comprises partially hydrogenating a polyunsaturated fatty compound selected from the group consisting of linolenic acid and esters and soaps thereof by subjecting said polyunsaturated fatty compound to the reducing activity of bacteria of the species selected from the group consisting of *Clostridium sporogenes* and *Lactobacillus helveticus*, and recovering the octadeca-11,15-dienoic acid.

2. The method as defined by claim 1 wherein the bacteria is *Clostridium sporogenes*.

3. The method as defined by claim 1 wherein the bacteria is *Lactobacillus helveticus*.

4. The method as defined by claim 1 wherein the polyunsaturated fatty compound is linseed oil.

5. The method as defined by claim 1 wherein the polyunsaturated fatty compound is soyabean oil.

6. The method as defined by claim 1 wherein the polyunsaturated fatty compound is linolenic acid.

References Cited

UNITED STATES PATENTS 3,290,226  12/1966  Beal _____ 195—30

OTHER REFERENCES

Chemical Abstracts, vol. 61, col. 2395c.

ALVIN E. TANENHOLTZ, Primary Examiner

U.S. Cl. X.R.

99—140; 260—410.7, 413